INVENTOR
PAUL W. CLAAR
BY

HIS ATTORNEYS

United States Patent Office 3,367,691
Patented Feb. 6, 1968

3,367,691
AUTOMATICALLY ALIGNING BALL STUD COUPLING
Paul W. Claar, Du Bois, Pa., assignor to Mack Trucks, Inc., Allentown, Pa., a corporation of New York
Filed July 27, 1966, Ser. No. 568,190
3 Claims. (Cl. 287—90)

ABSTRACT OF THE DISCLOSURE

A ball coupling which is automatically self-aligning and includes a socket member having a pair of bearing members freely rotatable therein and having eccentrically located concave sockets therein for receiving a ball on a ball stud and enabling limited universal movement of the ball relative to the socket and compensating for misalignment of components by rotation of the bearing members relative to the socket member.

---

This invention relates to improvements in ball stud couplings, and more particularly to ball stud couplings of the type used in steering, clutch, accelerator linkages and the like.

Ball couplings commonly used in linkage systems of the type mentioned above include a stud member which has a ball-like head received in opposed hemispherical cavities in a link or other member, permitting limited universal movement of the stud relative to the link. When a link which is coupled to a ball stud has its ends at substantially fixed locations, it frequently becomes necessary to make an accurate adjustment and positioning of the ball stud in order to allow free and unrestricted movement of the linkage system. In such cases, it is necessary to hand-fit the matching parts or provide special adjusting means to compensate for misalignment, all resulting in a loss of time in installing and aligning the system and in additional expense.

In accordance with the present invention, a ball stud coupling is provided which is self-aligning, permitting self-adjustment to compensate for misalignment of components and permitting the parts to be made to less exact tolerances and eliminating the possibility of breaking or damaging the system.

More particularly, in accordance with the present invention, a typical coupling includes a stud having a ball-like head thereon which is received in concavities in a pair of relatively freely rotatable members in a second component of the coupling such as a link or the like, the concavities being located eccentrically with relation to the axis of rotation of the members so that a rather wide range of adjustment of the connection between the stud and the link is possible by rotation of the rotatable members in the linkage system. Thus, misalignment or movement with resulting possible misalignment is automatically compensated by the eccentric mounting of the ball stud in the cooperating component and without introducing any undesirable play which might adversely affect operation of the coupling.

Figure 1:
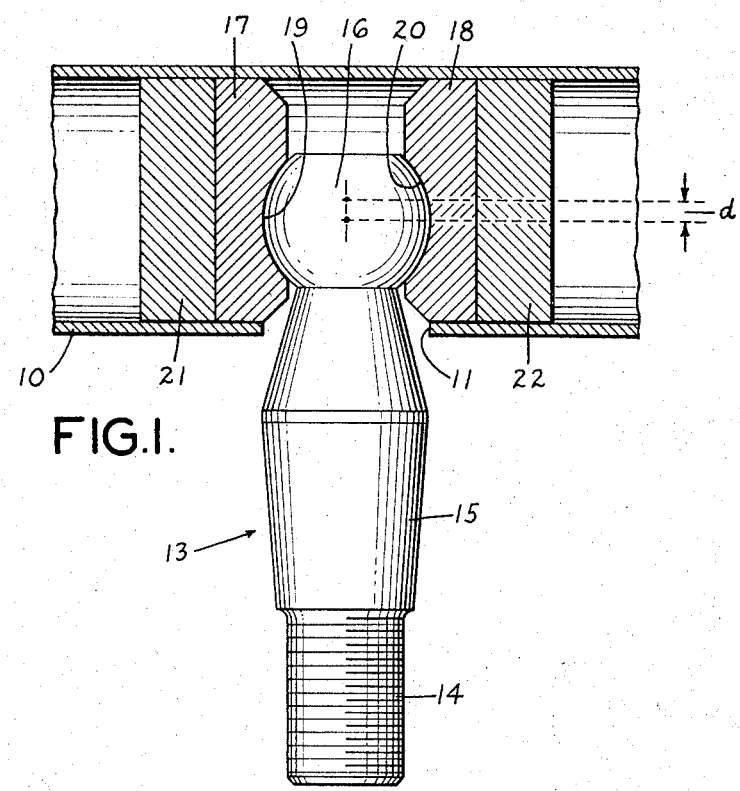
Figure 2:
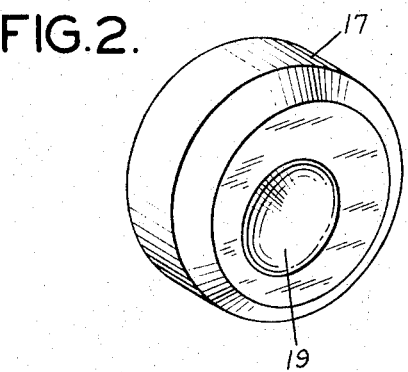

For a better understanding of the present invention, reference may be had to the accompanying drawings, in which:

FIGURE 1 is a view in section through a typical coupling embodying the present invention; and FIGURE 2 is a perspective view of one of the elements of the coupling.

Referring now to FIGURE 1, the invention is illustrated in the application of a ball stud to a link member of a linkage system, such as a steering system, accelerator pedal linkage, clutch linkage system or the like in a motor vehicle, although it is not limited to such uses.

FIGURE 1 shows a portion of a shaft or link member 10 of hollow annular cross-section provided with an aperture 11 in one side thereof to enable the insertion of the ball stud 13. The stud is of conventional type having a threaded shank 14 and intermediate stud or body portion 15 of any desired shape and size and a generally spherical ball head 16 which enables it to be coupled to the link 10 with capacity for limited universal movement. Mounted rotatably within the hollow link 10 are a pair of disks 17 and 18 which are essentially mirror images of each other. The disks 17 and 18 are provided with semi-spherical concavities or recesses 19 and 20 which receive the ball 16 rotatably and couple it to the link 10. The disks 17 and 18 may be backed up and retained in position by means of other disks 21 and 22 which may be retained in fixed position in the link 10 by means of screws or other means, such as coil springs or the like, not shown. The feature of the present invention is the location of the concave recesses 19 and 20 eccentric to the axis of each disk 17 and 18 so that upon rotation of the disks, the ball has a capacity for movement in any direction relative to the axis of the link equal to the offset of the centers of the concavities 19 and 20 from the axis of the disks, i.e., the distance $d$ indicated in dotted lines in FIGURE 1. Accordingly, when the stud 13 is coupled to the link 10, if any misalignment occurs in any direction, the disks 17 and 18 can rotate and thus correct for such misalignment by repositioning the ball head 16 with respect to the link, and also positioning the stud 13 as a whole in proper relation to the link 10 and other linkage elements or structural elements connected with the stud 13. The capacity for adjustment of the ball stud relative to the link enables a single type of ball coupling embodying the invention to be used in different systems and in different relations of the linkages where several different types of ball stud couplings were required formerly. This has the collateral advantage of reducing the inventory of parts required in servicing linkage and other systems so that maintenance and servicing costs are substantially reduced.

It will be understood, of course, that the coupling is useful in other systems or mechanical assemblies than linkage systems and that it can be modified in the manner in which the coupling disks are mounted, as well as in the shape and dimensions of the various parts, depending upon requirements. Accordingly, the form of the invention described herein should be considered as illustrative and not as limiting the scope of the invention as defined in the following claims.

I claim:
1. A self-aligning ball joint comprising a stud having a ball at one end thereof, a socket element having an opening therein for receiving said ball, a pair of spaced substantially coaxial bearing members freely rotatably mounted in said socket element on opposite sides of said ball, said members having concave recesses in opposing surfaces thereof receiving and retaining said ball therebetween, said recesses being disposed eccentrically with respect to the axis of rotation of said members and said axis of rotation being normal to the axis of said stud.

2. The ball joint set forth in claim 1 in which said socket element has a cylindrical cavity therein and said members are circular and are rotatably mounted in said cavity.

3. The ball joint set forth in claim 1 in which said socket element is of annular cross-section and said members are substantially parallel disks rotatably mounted in said socket element on opposite sides of said ball.

References Cited

UNITED STATES PATENTS

| | | | |
|---|---|---|---|
| 1,409,954 | 3/1922 | Johnston | 287—21 |
| 1,478,052 | 12/1923 | Oliver. | |
| 1,854,925 | 4/1932 | Crawford | 287—90 |
| 2,167,174 | 7/1939 | Flumerfelt. | |
| 2,900,196 | 8/1959 | Nienke | 280—96.1 |
| 2,923,555 | 2/1960 | Kost et al. | |
| 3,147,025 | 9/1964 | Good | 287—90 X |

CARL W. TOMLIN, *Primary Examiner.*

A. V. KUNDRAT, *Assistant Examiner.*